(12) United States Patent
Park

(10) Patent No.: US 11,171,375 B2
(45) Date of Patent: Nov. 9, 2021

(54) STEPPED ELECTROCHEMICAL CELLS WITH FOLDED SEALED PORTION

(71) Applicant: ENEVATE CORPORATION, Irvine, CA (US)

(72) Inventor: Benjamin Yong Park, Mission Viejo, CA (US)

(73) Assignee: Enevate Corporation, Irine, CA (US)

(*) Notice: Subject to any disclaimer, the term of this patent is extended or adjusted under 35 U.S.C. 154(b) by 785 days.

(21) Appl. No.: 15/081,801

(22) Filed: Mar. 25, 2016

(65) Prior Publication Data
US 2017/0279093 A1    Sep. 28, 2017

(51) Int. Cl.
| H01M 2/08 | (2006.01) |
| H01M 6/42 | (2006.01) |
| H01M 50/183 | (2021.01) |
| H01M 10/04 | (2006.01) |
| H01M 50/10 | (2021.01) |
| H01M 50/116 | (2021.01) |

(Continued)

(52) U.S. Cl.
CPC ..... *H01M 50/183* (2021.01); *H01M 10/0436* (2013.01); *H01M 10/0525* (2013.01); *H01M 50/10* (2021.01); *H01M 50/116* (2021.01); *H01M 50/124* (2021.01)

(58) Field of Classification Search
CPC .... H01M 2/08; H01M 2/0285; H01M 2/0287; H01M 10/0525
USPC ........................................................ 429/185
See application file for complete search history.

(56) References Cited

U.S. PATENT DOCUMENTS

| 4,374,909 A | 2/1983 | Tucholski | |
| 5,919,586 A * | 7/1999 | Springstead | ............ H01M 2/08 429/164 |

(Continued)

FOREIGN PATENT DOCUMENTS

| JP | 59014252 A * | 1/1984 |
| JP | 2002-237279 | 8/2002 |

(Continued)

OTHER PUBLICATIONS

English translation of Hosoi, JP-59014252-A, 1984, Japan.*

(Continued)

*Primary Examiner* — Cynthia H Kelly
*Assistant Examiner* — Julian Anthony
(74) *Attorney, Agent, or Firm* — McAndrews, Held & Malloy, Ltd.

(57) ABSTRACT

A pouched energy storage device can include a cell housing portion and a sealed portion. The device can also include a stack of electrodes housed within an inner region of the cell housing portion. Each electrode can have dimensions of width, length, and thickness. One or more electrodes can have at least one of the dimensions smaller than a corresponding dimension of other electrodes in the stack of electrodes. The device can also include an indentation on the cell housing portion adjacent the sealed portion. The indentation can form a stepped region in the inner region that is complimentary to the one or more electrodes having at least one of the dimensions smaller than a corresponding dimension of other electrodes in the stack of electrodes. The sealed portion can be folded onto the cell housing portion so that at least a part of the sealed portion resides in the indentation.

27 Claims, 6 Drawing Sheets

(51) Int. Cl.
*H01M 50/124* (2021.01)
*H01M 10/0525* (2010.01)

(56) References Cited

U.S. PATENT DOCUMENTS

| | | | |
|---|---|---|---|
| 8,603,683 B2 | 12/2013 | Park et al. |
| 9,178,208 B2 | 11/2015 | Park et al. |
| 9,397,338 B2 | 7/2016 | Park et al. |
| 9,553,303 B2 | 1/2017 | Park et al. |
| 9,583,757 B2 | 2/2017 | Park et al. |
| 9,620,809 B2 | 4/2017 | Teixidor et al. |
| 9,647,259 B2 | 5/2017 | Park et al. |
| 9,806,328 B2 | 10/2017 | Park et al. |
| 9,941,509 B2 | 4/2018 | Park et al. |
| 9,997,765 B2 | 6/2018 | Park |
| 10,103,378 B2 | 10/2018 | Park et al. |
| 10,388,943 B2 | 8/2019 | Bonhomme et al. |
| 10,431,808 B2 | 10/2019 | Park et al. |
| 10,461,366 B1 | 10/2019 | Anderson et al. |
| 10,516,155 B2 | 12/2019 | Park et al. |
| 2010/0003594 A1* | 1/2010 | Hong ............ H01M 2/021 429/163 |
| 2010/0255376 A1 | 10/2010 | Park et al. |
| 2011/0020701 A1 | 1/2011 | Park et al. |
| 2011/0117394 A1 | 5/2011 | Hwang et al. |
| 2012/0219847 A1* | 8/2012 | Hong ............ H01M 2/021 429/163 |
| 2014/0011078 A1 | 1/2014 | Park et al. |
| 2014/0050958 A1* | 2/2014 | Kwon ............ H01M 10/0583 429/94 |
| 2014/0170498 A1 | 6/2014 | Park |
| 2016/0087252 A1 | 3/2016 | Hong et al. |
| 2017/0040598 A1 | 2/2017 | Wang et al. |
| 2017/0133664 A1 | 5/2017 | Park |
| 2017/0155126 A1 | 6/2017 | Park |
| 2017/0170510 A1 | 6/2017 | Teixidor et al. |
| 2018/0226642 A1 | 8/2018 | Wang et al. |
| 2018/0287129 A1 | 10/2018 | Park |
| 2019/0178944 A1 | 6/2019 | Rango et al. |
| 2019/0181426 A1 | 6/2019 | Park et al. |
| 2019/0181431 A1 | 6/2019 | Canton |
| 2019/0181434 A1 | 6/2019 | Lee et al. |
| 2019/0181440 A1 | 6/2019 | Park et al. |
| 2019/0181441 A1 | 6/2019 | Ji et al. |
| 2019/0181491 A1 | 6/2019 | Park et al. |
| 2019/0181492 A1 | 6/2019 | Liu et al. |
| 2019/0181500 A1 | 6/2019 | Ji et al. |
| 2019/0181501 A1 | 6/2019 | Ji et al. |
| 2019/0181502 A1 | 6/2019 | Ji et al. |
| 2019/0190069 A1 | 6/2019 | Ji et al. |
| 2019/0190070 A1 | 6/2019 | Ji et al. |
| 2019/0355966 A1 | 11/2019 | Kamath et al. |
| 2019/0372088 A1 | 12/2019 | Bonhomme et al. |

FOREIGN PATENT DOCUMENTS

| | | |
|---|---|---|
| KR | 2013-0005528 | 1/2013 |
| KR | 2014-0061153 | 5/2014 |
| KR | 2015-0101551 | 9/2015 |
| KR | 2015-0134683 | 12/2015 |
| WO | WO 2017/165122 | 9/2017 |

OTHER PUBLICATIONS

International Search Report and Written Opinion for International Application No. PCT/US2017/021445, dated May 4, 2017 in 13 pages.
Written Opinion for International Application PCT/US2017/021445, dated May 30, 2018 in 5 pages.
International Preliminary Report on Patentability for International Application PCT/US2017/021445, dated Aug. 13, 2018 in 17 pages.
Issuance of Office Action, by the Japanese Patent Office for Japanese Patent Application No. 2018-549938.

* cited by examiner

STEPPED ELECTROCHEMICAL CELLS WITH FOLDED SEALED PORTION

BACKGROUND

Field

The present disclosure relates generally to energy storage devices, such as electrochemical cells (e.g., batteries). In particular, the present disclosure relates to stepped electrochemical cells and packages to house electrochemical cell components.

Description of the Related Art

A battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electrochemically active material layers on electrically conductive metals (e.g., aluminum and copper). Films can be rolled or cut into pieces which are then layered into stacks. The stacks are of alternating electro-chemically active materials with the separator between them.

An energy storage device, such as an electrochemical cell (e.g., a battery) can include packaging to house the electrochemical cell components (e.g., the anode, cathode, separator, and/or electrolyte). A pouch pack is one example packaging for an energy storage device. For example, a pouched energy storage device can include a pouch pack for the package to house the electrochemical cell components.

SUMMARY

In certain embodiments, a pouched energy storage device is provided. The device can include a cell housing portion and a sealed portion. The device can also include a stack of electrodes housed within an inner region of the cell housing portion. Each electrode can have dimensions of width, length, and thickness. One or more electrodes can have at least one of the dimensions smaller than a corresponding dimension of other electrodes in the stack of electrodes. The device can also include an indentation on the cell housing portion adjacent the sealed portion. The indentation can form a stepped region in the inner region that is complimentary to the one or more electrodes having at least one of the dimensions smaller than a corresponding dimension of other electrodes in the stack of electrodes. The sealed portion can be folded onto the cell housing portion so that at least a part of the sealed portion resides in the indentation. In various embodiments, the device can include a lithium ion battery, a lithium polymer battery, or a metal lithium battery.

In some embodiments of the device, the walls of the cell housing portion can have a wall thickness, and the sealed portion can have a sealed portion thickness that is approximately twice the wall thickness of the walls of the cell housing portion. In some embodiments, the device can have a first major exterior surface, a second major exterior surface, and a device thickness extending therebetween. The sealed portion can have a sealed portion width, a sealed portion length, and a sealed portion thickness. The device thickness can be smaller than the sealed portion width. In some examples, the sealed portion width can be in the range of about 1.5 mm to about 10 mm.

In various embodiments, the device can include a first major surface and a second major surface. The sealed portion can be folded adjacent the first major surface of the device. The indentation can be located adjacent the second major surface of the device.

In some embodiments, the device can include at least two sealed portions. The sealed portion can be folded to form multiple layers. The sealed portion can be attached onto the cell housing portion.

In certain embodiments, a method of making a pouched energy storage device is provided. The method can include providing walls to define an inner region of the cell housing portion. The walls can be configured to house within the inner region an anode, a cathode, a separator, and an electrolyte. The method can also include inserting a stack of electrodes into the cell housing portion. Each electrode can have dimensions of width, length, and thickness. One or more electrodes can have at least one of the dimensions smaller than a corresponding dimension of other electrodes in the stack of electrodes. The method can further include heat sealing portions of the walls to form the sealed portion. The method can further include folding the sealed portion onto the cell housing portion such that part of the sealed portion resides in an indentation of the cell housing portion.

In various embodiments, the method can further include forming the indentation on the cell housing portion. The indentation can be sized to accommodate at least part of the sealed portion. The indentation can define a stepped region in the inner region.

In some embodiments, providing the walls can comprise providing aluminum laminate pouch material. Heat sealing portions of the walls can comprise hermetically sealing the portions of the walls. In addition, folding the sealed portion onto the cell housing portion can include folding a first region of the sealed portion adjacent a first major surface of the device, and folding a second region of the sealed portion adjacent a second major surface of the device. The method can also include attaching the sealed portion onto the cell housing portion.

In certain embodiments, a pouch for an energy storage device is provided. The pouch can include a cell housing portion and a sealed portion. The cell housing portion can have walls defining an inner region. The walls can be configured to house within the inner region an anode, a cathode, a separator, and an electrolyte. The cell housing portion can include an indentation. The sealed portion can extend from the cell housing portion. The sealed portion can be folded onto the cell housing portion such that part of the sealed portion resides in the indentation. In some embodiments, the indentation can form a stepped region in the inner region of the cell housing portion.

In various embodiments of the pouch, the walls can be configured to house a lithium ion battery, a lithium polymer battery, or a metal lithium battery. The walls of the cell housing portion and the sealed portion can include an aluminum laminate pouch material. In some embodiments, the walls of the cell housing portion can have a wall thickness, and the sealed portion can have a sealed portion thickness that is approximately twice the wall thickness of the walls of the cell housing portion. In some embodiments, the pouch can include a first major exterior surface, a second major exterior surface, and a pouch thickness extending therebetween. The sealed portion can have a sealed portion width, a sealed portion length, and a sealed portion thickness. The pouch thickness can be smaller than the sealed portion width. In some examples, the sealed portion width can be in the range of 1.5 mm to about 10 mm.

In various embodiments, the pouch can include a first major surface and a second major surface. The sealed portion can be folded adjacent the first major surface of the pouch. The indentation can be located adjacent the second major surface of the pouch.

In some embodiments, the pouch can include at least two sealed portions. The sealed portion can be folded to form multiple layers. The sealed portion can be attached onto the cell housing portion.

The examples in the figures are not drawn to scale. Features may have been exaggerated to illustrate certain features. For example, the thickness of certain sheets and/or walls may have been exaggerated.

DETAILED DESCRIPTION

A pouch pack can be used as packaging for an energy storage device, such as an electrochemical cell (e.g., a battery such as a pouch cell). The pouch can be heat sealed to hermetically (or near hermetically) seal electrochemical cell components including an anode, a cathode, a separator, and electrolyte within the pouch. In general, the pouch does not store energy and thus can be considered an inactive part of the device. In some instances, to maximize packaging efficiency and energy density, minimizing the pouch footprint within a product can be critical.

Figure 1:
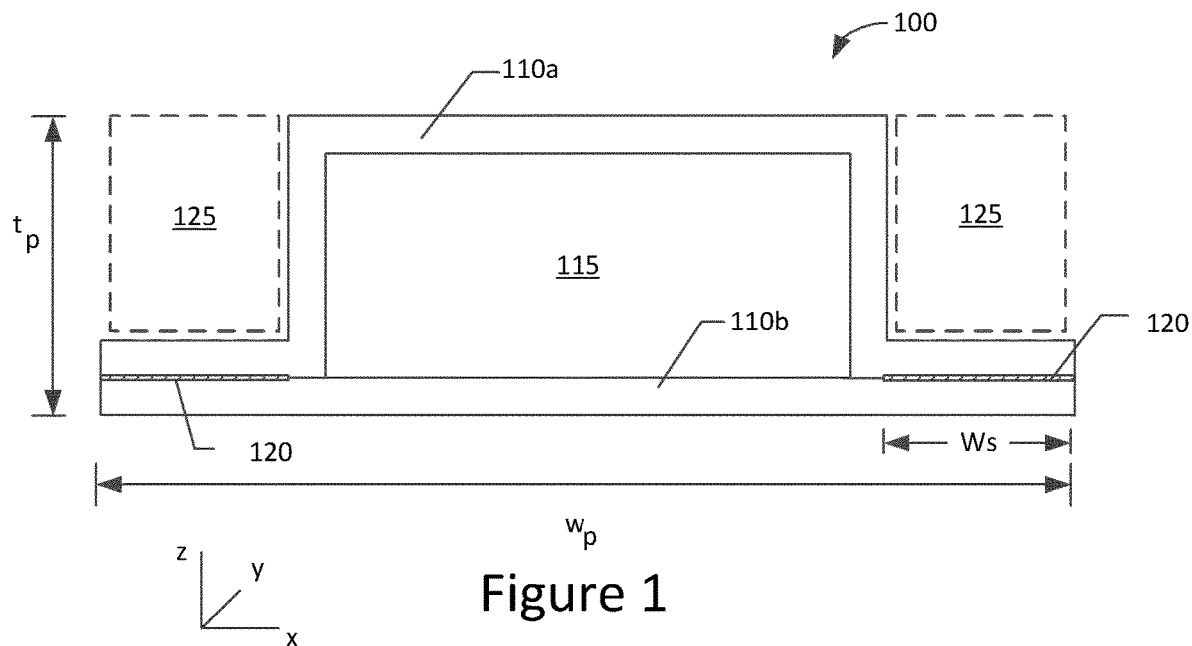
FIGS. 1, 2, 3, 4, and 5 schematically illustrate cross-sectional views of example energy storage device packages with side seals.

FIG. 1 schematically illustrates a cross-sectional view of an example energy storage device package, such as an electrochemical cell package (e.g., a battery pouch) with side seals. As shown in FIG. 1, the package 100 includes a first sheet 110a and a second sheet 110b defining an inner region 115 to house the electrochemical cell components (not shown). The package 100 also includes two side seals 120 formed by sealing together parts of the first 110a and second 110b sheets. For example, a first sheet 110a can be formed into a U-shaped compartment in which to insert the electrochemical cell components. After the electrochemical cell components are inserted, a second sheet 110b can be sealed to parts of the first sheet 110a to seal the electrochemical cell components within the inner region 115. Each side seal 120 can have a width $w_s$ sufficient to seal the package 100 together such that the side seal 120 does not leak.

As shown in FIG. 1, the package 100 can have a width $w_p$ (e.g., dimension extending in the x direction), length (not shown) (e.g., dimension extending in the y direction), and thickness $t_p$ (dimension extending in the z direction). When this example package 100 is used as a package for an energy storage device, the dimensions of the device can be defined by the dimensions of the package 100. For example, the width of the device can be defined by the width $w_p$ of the package, the length of the device can be defined by the length of the package 100, and the thickness of the device can be defined by the thickness $t_p$ of the package 100.

As also shown in FIG. 1, when this example package 100 is used as the package for an energy storage device, the device can include regions of unused space (e.g., regions 125 above each side seal 120). Accordingly, for devices utilizing a package such as the package 100 shown in FIG. 1, there is room to improve the packaging efficiency and energy density by decreasing the unused space in the device.

Figure 2:
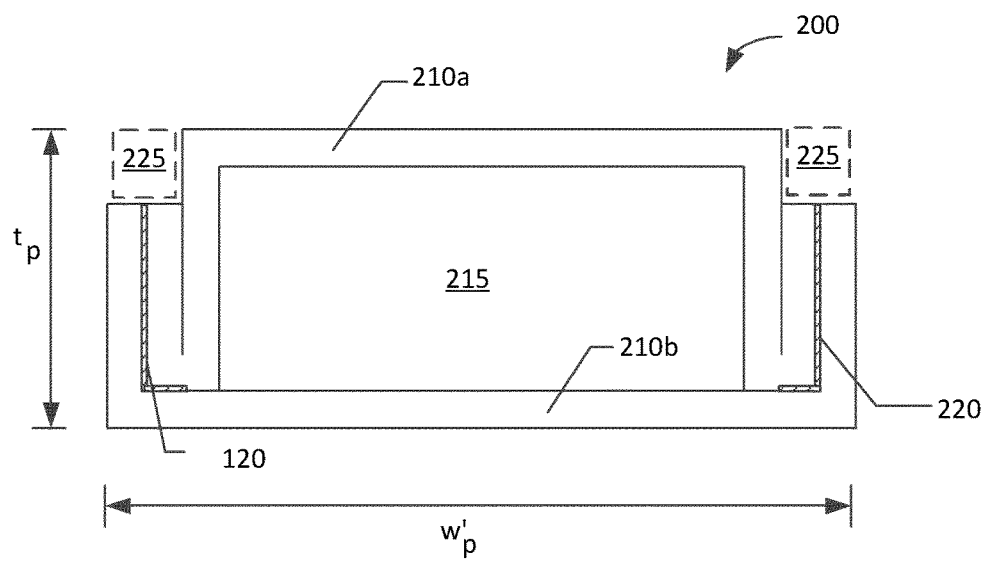
Figure 3:
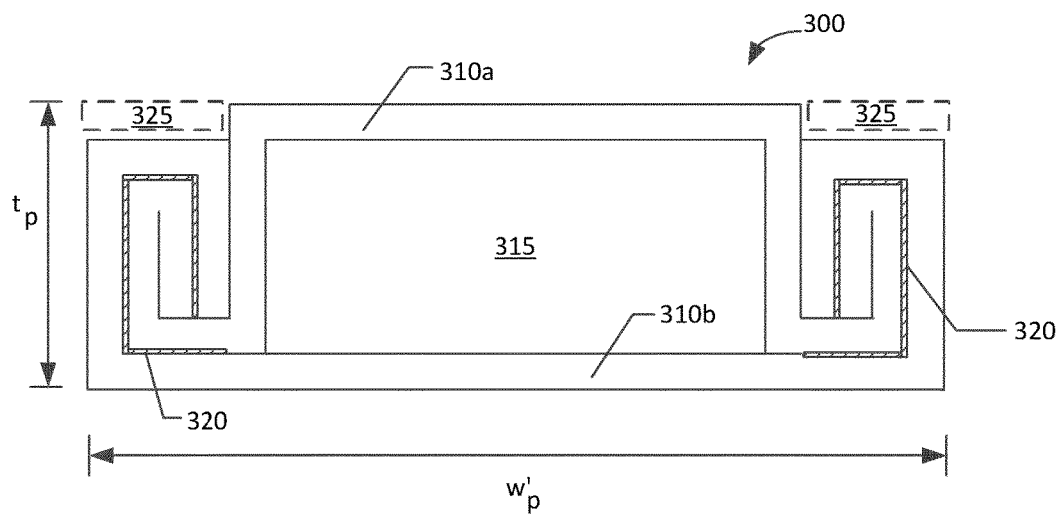
Figure 4:
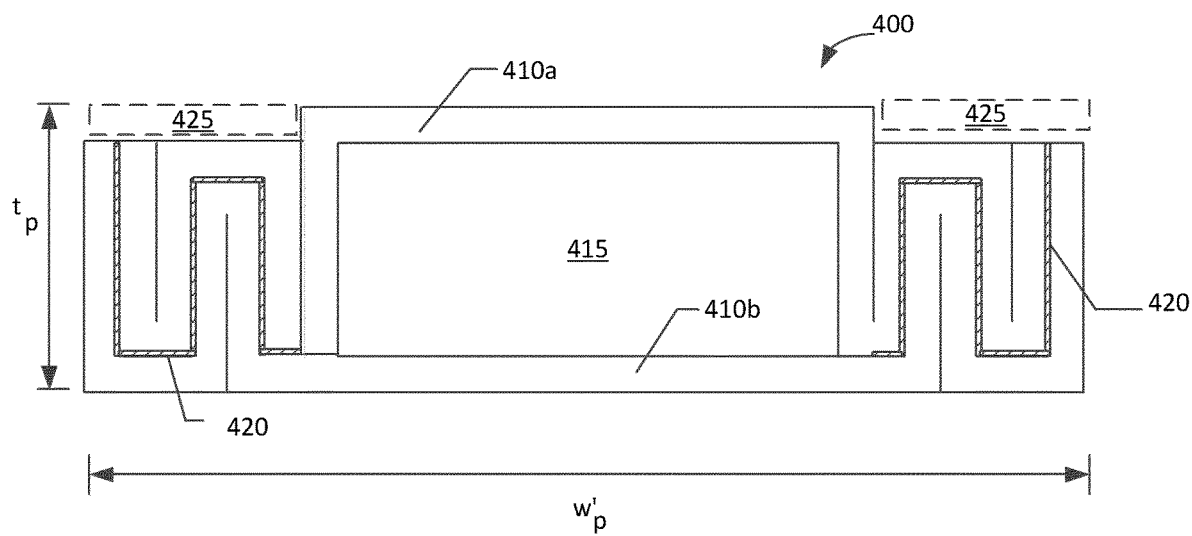

FIGS. 2-4 schematically illustrate cross-sectional views of example energy storage device packages with folded side seals. As shown in FIG. 2, when a side seal 220 has a width $w_s$, (e.g., when unfolded) that is smaller than the package thickness $t_p$ (e.g., $w_s < t_p$), the side seal 220 can be folded up. Compared to when a side seal 220 is unfolded, this example package 200 can have a reduced package width $w'_p$ and reduced unused space 225 in the device. When a side seal has a width $w_s$ that is larger than the package thickness $t_p$ (e.g., $w_s > t_p$), the side seal can be folded on a side of the package with multiple folds. For example, FIG. 3 shows a package 300 having a side seal 320 with a double fold (e.g, 1 fold up and 1 fold down). As another example, FIG. 4 shows a package 400 having a side seal 420 with a triple fold (e.g., 1 fold up, 1 fold down, and 1 fold up). Compared to when the side seals 320, 420 are unfolded, these example packages 300, 400 can also have a reduced package width $w'_p$ and reduced unused space 325, 425. However, with a package having very a small thickness $t_p$ (e.g., designed for a relatively thin energy storage device), it can be difficult to crease and fold the side seals 320, 420 into folds with such a small size (e.g., folds $\approx t_p$). Such folded packages can require additional equipment and can have quality issues (e.g., leaking).

Figure 5:
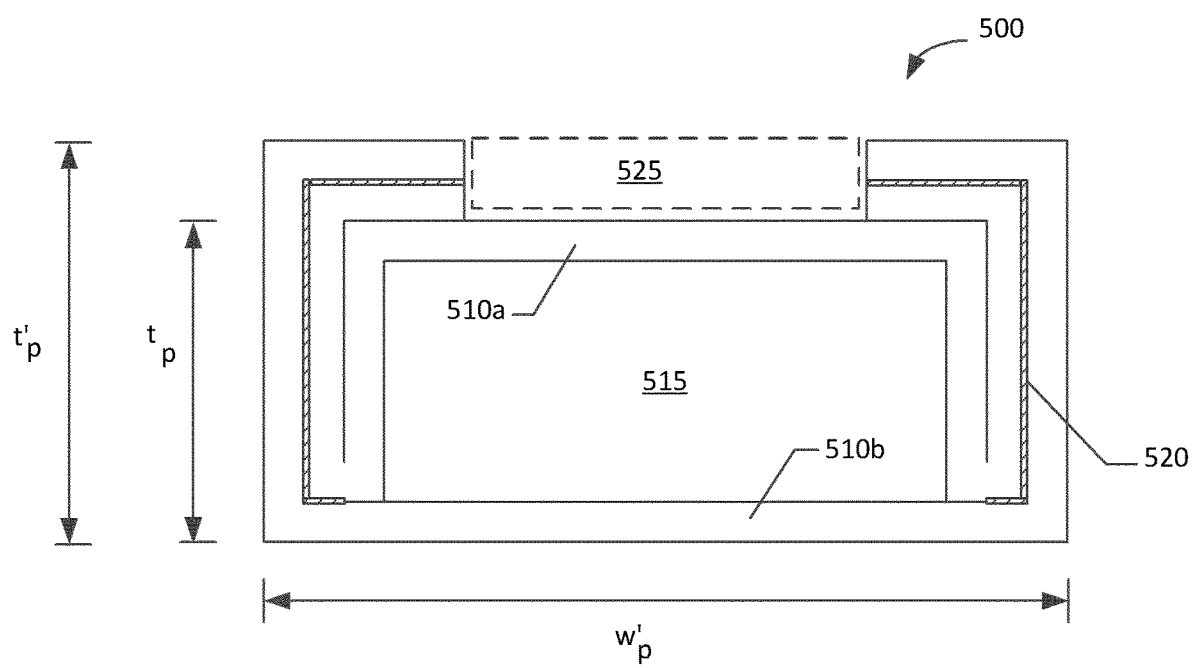

FIG. 5 schematically illustrates a cross-sectional view of another example energy storage device package with side seals. As shown in the example package 500 in FIG. 5, when a side seal 520 (when unfolded) has a width $w_s$ that is larger than the package thickness $t_p$ (e.g., $w_s > t_p$), the side seal 520 can be folded on the package 500 (e.g., on the top of the package 500). Compared to when the side seal 520 is unfolded, such a package 500 can have a reduced package width $w'_p$. However, folding a side seal 520 this way can increase the package thickness $t_p'$ and can add unused space 525 in the device (e.g., between the folded side seals 520 on top of the package 500 as shown in FIG. 5). Accordingly, for devices utilizing these example packages shown in FIGS. 1-5, there is room to improve (e.g., maximize) the packaging efficiency and energy density by decreasing (e.g., minimizing) the unused space in the device.

Figure 6A:
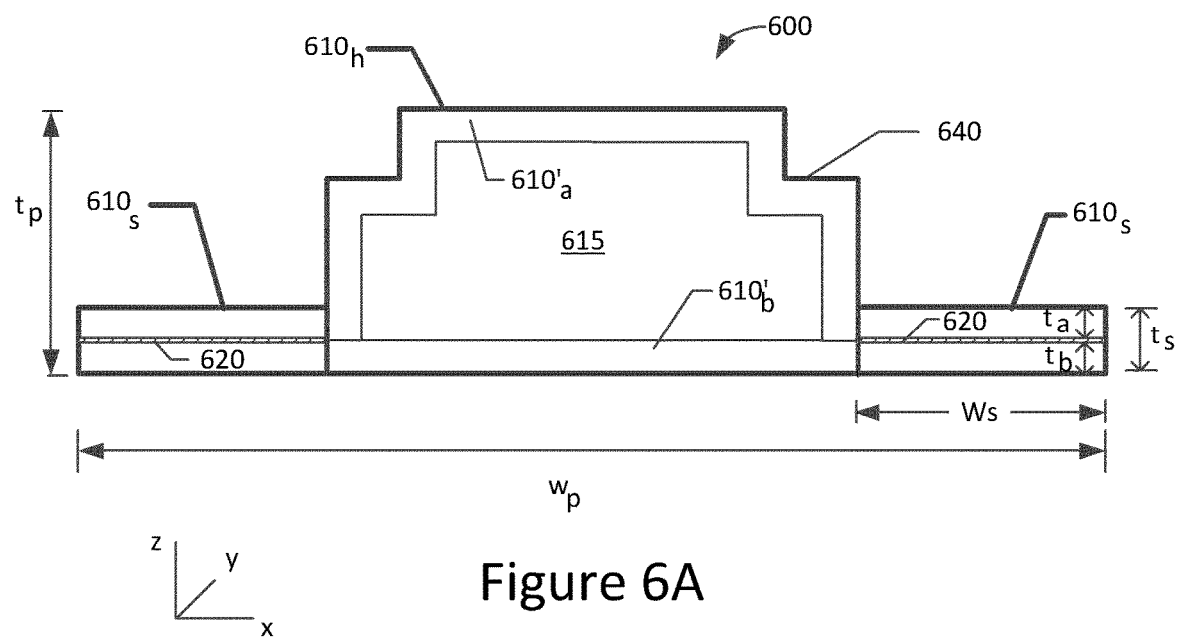
FIG. 6A schematically illustrates a cross-sectional view of an example energy storage device package with unfolded side seals in accordance with certain embodiments described herein.
Figure 6B:
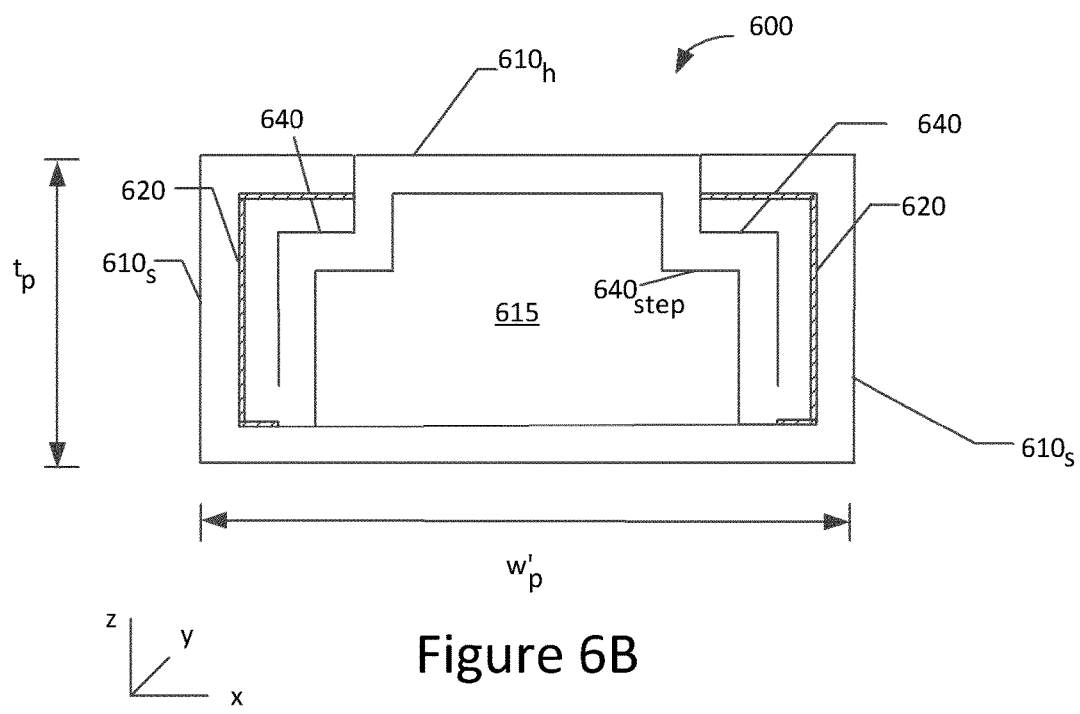
FIG. 6B schematically illustrates a cross-sectional view of the example energy storage device package shown in FIG. 6A with folded side seals in accordance with certain embodiments described herein.

FIGS. 6A-6B schematically illustrate cross-sectional views of an example energy storage device package with side seals in accordance with certain embodiments described herein. FIG. 6A shows the example package 600 with the side seals 620 unfolded, and FIG. 6B shows the example package 600 with the side seals 620 folded. The example package 600 (e.g., pouch) can include a cell housing portion $610_h$ and a sealed portion $610_g$. As shown in FIG. 6A, the cell housing portion $610_h$ can have walls $610'_a$, $610'_b$ defining an inner region 615. The walls $610'_a$, $610'_b$ can be configured to house within the inner region 615 an anode, a cathode, a separator, and an electrolyte (not shown). The cell housing portion $610_h$ can include an indentation 640. The sealed portion $610_s$ can extend from the cell housing portion $610_h$. As shown in FIG. 6B, the sealed portion $610_s$ can be folded onto the cell housing portion $610_h$ such that part of the sealed portion $610_s$ can reside in the indentation 640. As described herein, a device utilizing such a package can have increased (e.g., substantially maximized in some cases) packaging efficiency and energy density by having reduced (e.g., substantially minimized in some cases) unused space.

Figure 6C:
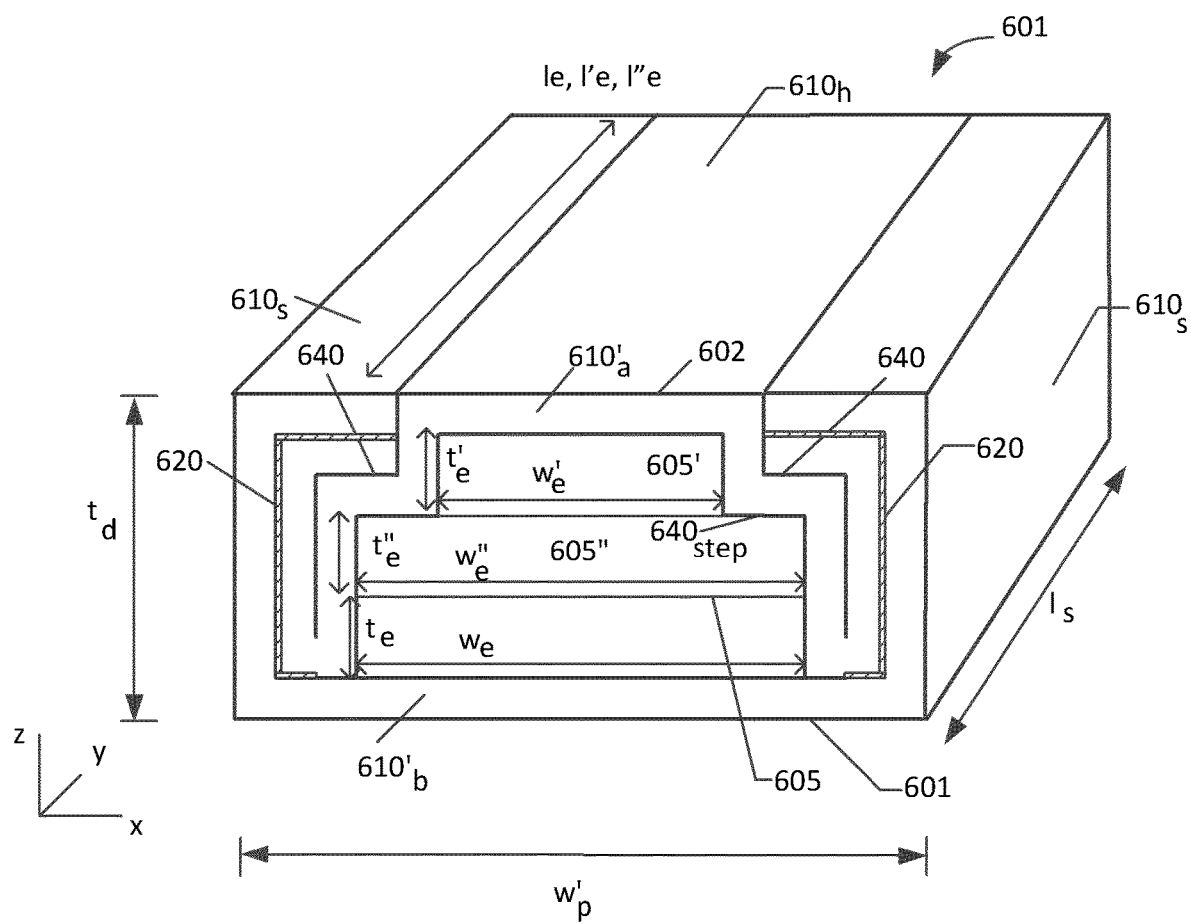
FIG. 6C schematically illustrates a perspective view of an example energy storage device utilizing the example package shown in FIGS. 6A-6B in accordance with certain embodiments described herein.

FIG. 6C schematically illustrates a perspective view of an example energy storage device utilizing the example package 600 shown in FIGS. 6A-6B. As shown in FIG. 6C, in various embodiments, the energy storage device 601, such as an electrochemical cell (e.g., a battery) can include the example package 600 having the cell housing portion $610_h$ and the sealed portion $610_s$. The cell housing portion $610_h$ can be configured to house a stack of electrodes 605 within an inner region 615 of the cell housing portion $610_h$. Each electrode 605 can have dimensions of width $w_e$, length $l_e$, and thickness $t_e$. One or more electrodes 605' can have at least one of the dimensions (e.g., $w'_e$, $l'_e$, and/or $t'_e$) smaller than a corresponding dimension (e.g., $w''_e$, $l''_e$, and/or $t''_e$) of other electrodes 605'' in the stack of electrodes 605. In the example energy storage device 601 shown in FIG. 6C, the electrode 605' has a width $w'_e$ that is smaller than the width $w''_e$ of the other electrode 605''.

By having one or more electrodes 605' having at least one of the dimensions smaller than a corresponding dimension of the other electrodes 605'' in the stack of electrodes 605, the indentation 640 on the cell housing portion $610_h$ can be disposed adjacent the one or more electrodes 605' having the at least one smaller dimension. For example, the indentation 640 can form a stepped region $640_{step}$ (e.g., in the inner region 615) that is complimentary to one or more electrodes 605' having at least one of the dimensions smaller than a corresponding dimension of the other electrodes 605'' in the stack of electrodes 605.

The sealed portion $610_s$ can be folded onto the cell housing portion $610_h$ so that at least a part of the sealed portion $610_s$ can reside in the indentation 640. Compared to the example shown in FIG. 5, the example embodiment shown in FIG. 6C can provide sealed portions $610_s$ that can be folded on the cell housing portion $610_h$ without increasing the thickness $t_p$ of the package 600, and hence also without increasing the thickness $t_d$ of the device 601. For example, instead of occupying additional space above the cell housing portion $610_h$, sealed portions $610_s$ can reside in spaces which would have been occupied by one or more electrodes 605' had they have similar dimensions as the other electrodes 605'' in the stack of electrodes 605. Since the unused space in the embodiment shown in FIG. 6C is reduced, the packaging efficiency and energy density can be improved.

In certain embodiments, the energy storage device 601 can include a battery. The battery can be either a secondary battery (e.g., rechargeable) or a primary battery (e.g., non-rechargeable). The battery is not particularly limited and can include those known in the art or yet to be developed. For example, the battery can include a lithium ion battery, a lithium polymer battery, or a metal lithium battery. In various embodiments, the battery can be implemented as a pouch cell.

As described herein, the energy storage device 601 can include a plurality of electrodes 605 within the inner region 615 of the cell housing portion $610_h$. The plurality of electrodes 605 can be arranged to form a stacked configuration, e.g., a stack of electrodes 605 with electrodes 605 disposed on top of one another. The electrodes 605 can include one or more anodes and/or one or more cathodes. The electrodes 605 can include electrochemically active material. The composition of the electrodes 605 is not particularly limited and can include electrode materials known in the art or yet to be developed. For example, the electrodes 605 can be selected based on the desired application and/or performance. In various embodiments, the one or more of the electrodes 605 can include silicon composite material, carbon composite material, and/or silicon-carbon composite material such as those described in U.S. patent application Ser. No. 13/008,800 entitled "Composite Materials for Electrochemical Storage," U.S. patent application Ser. No. 13/601,976 entitled "Silicon Particles for Battery Electrodes," and/or U.S. patent application Ser. No. 13/799,405 entitled "Silicon Particles for Battery Electrodes," each of which are expressly incorporated herein. In some embodiments, one or more electrodes 605 can include self-supported monolithic structures. For example, the electrode 605 can include a composite material including a substantially continuous phase comprising hard carbon and holding the composite material together. In some embodiments, one or more electrodes 605 can include a current collector such as a copper sheet. For example, in some such embodiments, an anode can be in contact with a negative current collector, and/or a cathode can be in contact with a positive current collector. In some embodiments, each negative current collector can have one anode attached to each side; each positive current collector can have one cathode attached to each side.

In various embodiments, the shapes and/or sizes of the anodes and cathodes can be the same or different from each other. In some embodiments, an anode and a cathode can be slightly different in size. For example, in lithium ion configurations where the metal oxide carries the lithium into the electrochemical cell, the cathode can be undersized compared to the anode. This can help prevent dendrite formation and lithium plating in some embodiments. For example, when lithium ions move from the cathode to the anode, if there is no anode to receive the lithium ions, the lithium ions could plate as a solid. The shapes and/or sizes of an anode and cathode are not particularly limited and can be selected based on the desired application and/or performance.

Each electrode 605 can have dimensions of width $w_e$, length $l_e$, and thickness $t_e$. In the example shown in FIG. 6C, the dimension of width $w_e$ can correspond to the dimension of the electrode 605 extending horizontally in the cross-sectional plane (e.g., in the x direction). The dimension of length $l_e$ can correspond to the dimension of the electrode 605 extending into the page perpendicular to the cross-sectional plane (e.g., in the y direction). The length $l_e$ is typically longer than the width $w_e$. The dimension of thickness $t_e$ can correspond to the dimension of the electrode 605 extending vertically in the cross-sectional plane (e.g., in the z direction). Other conventions for defining width $w_e$, length $l_e$, and thickness $t_e$ are possible. The actual dimensions of width $w_e$, length $l_e$, and thickness $t_e$ are not particularly limited and can be selected for the intended application and/or desired performance.

One or more electrodes 605' can have at least one of the dimensions (e.g., $w'_e$, $l'_e$, and/or $t'_e$) smaller than a corresponding dimension (e.g., $w''_e$, $l''_e$, and/or $t''_e$) of other electrodes 605'' in the stack of electrodes 605. For example, as shown in FIG. 6C, the uppermost electrode (or electrodes) 605' has a dimension smaller than a corresponding dimension of the other electrodes 605''. The one or more electrodes 605' can include an anode and/or a cathode. The one or more electrodes 605' can include an electrode pair (e.g., an anode and a cathode). In this particular example, the uppermost electrode 605' can have a width $w'_e$ smaller than the width $w''_e$ of the other electrodes 605". In some embodiments, the length $l'_e$ of one or more electrodes 605' can be smaller than the length $l_e$ of the other electrodes 605". In some embodiments, the thickness $t'_e$ of one or more electrodes 605' can be smaller than the thickness $t''_e$ of the other electrodes 605". The actual dimensions of the smaller width $w'_e$, length $l'_e$, and/or thickness $t'_e$ of the one or more electrodes 605' are not particularly limited and can be selected such that at least a part of the sealed portion 610$_s$ can be disposed within the space created by having the smaller electrode or electrodes 605'. In various embodiments, the dimensions of the smaller width $w'_e$, length $l'_e$, and/or thickness $t'_e$ of the one or more electrodes 605' can be sized such that there is just enough room for the sealed portion 601$_s$ to fold onto the cell housing portion 610$_h$ and fit into the indentation 640. For example, in some embodiments, the width $w'_e$ of the smaller electrode 605' can be smaller than the corresponding width $w''_e$ of the other electrodes 605" by approximately twice the width $w_s$ of the sealed portion 610$_s$ minus twice the thickness $t_d$ of the device 601.

In various embodiments, the energy storage device 601 can include a separator separating each anode and cathode. For example, the separator can be shaped and/or dimensioned such that it can be positioned between adjacent electrodes 605 in the electrode stack to provide desired separation between the adjacent electrodes 605. The separator can be configured to facilitate electrical insulation between an anode and cathode, while permitting ionic transport between the anode and the cathode. The composition of the separator is not particularly limited and can include those known in the art or yet to be developed. In some embodiments, the separator can comprise a porous material, including a porous polyolefin material.

The stack of electrodes 605 can be in contact with an electrolyte. In some embodiments, the stack of electrodes 605 can be immersed in electrolyte. The electrolyte can serve to facilitate ionic transport between an anode and a cathode. The composition of the electrolyte is not particularly limited and can include those known in the art or yet to be developed. For example, the composition of the electrolyte can be selected based on the application and/or desired performance. In some embodiments, the electrolyte can include a nonaqueous electrolyte solution. For example, the electrolyte can include a carbonate solvent.

As shown in FIGS. 6A-6C, the energy storage device 600 can include walls 610'$_a$, 610'$_b$ to define an inner region 615 of the cell housing portion 610$_h$. In various embodiments, the walls 610'$_a$, 610'$_b$ can be configured to house within the inner region 615 an anode, a cathode, a separator, and an electrolyte. The cell housing portion 610$_h$ can include at least one indentation 640. In some embodiments, the walls 610'$_a$, 610'$_b$ of the cell housing portion 610$_h$ can comprise a flexible material. For example, the walls 610'$_a$, 610'$_b$ of the cell housing portion 610$_h$ may readily deform upon application of pressure on the walls 610'$_a$, 610'$_b$, including pressure exerted upon the walls 610'$_a$, 610'$_b$ from outside and from within the package 600. The walls 610'$_a$, 610'$_b$ of the cell housing portion 610$_h$ can also readily deform to follow the shape of the stack of electrodes 605 such that the walls 610'$_a$, 610'$_b$ can form one or more indentations 640 adjacent the one or more smaller electrodes 605'. For example, the example embodiment shown in FIG. 6C includes two indentations (e.g., one on the left and one on the right) in wall 610'$_a$. The indentation 640 can form a stepped region 640$_{step}$ in the inner region 615 of the cell housing portion 610$_h$. In some embodiments, the walls 610'$_a$, 610'$_b$ of the cell housing portion 610$_h$ may comprise the same material. In some other embodiments, the walls 610'$_a$, 610'$_b$ of the cell housing portion 610$_h$ may comprise different materials. In various embodiments, one or more of the walls 610'$_a$, 610'$_b$ of the cell housing portion 610$_h$ may comprise aluminum. For example, one or more of the walls 610'$_a$, 610'$_b$ of the cell housing portion 610$_h$ may comprise an aluminum laminated pouch material.

As shown in FIG. 6A, the walls 610'$_a$, 610'$_b$ of the cell housing portion 610$_h$ can have a wall thickness $t_a$, $t_b$. One or more of the walls 610'$_a$, 610'$_b$ of the cell housing portion 610$_h$ can have the same or different wall thickness $t_a$, $t_b$ from each other. In some embodiments, one or more of the walls 610'$_a$, 610'$_b$ of the cell housing portion 610$_h$ can have a thickness $t_a$, $t_b$ in the range of about 50 microns to about 220 microns, or in a range between the foregoing values, such as of about 70 microns to about 200 microns (e.g., about 70 microns, about 80 microns, about 90 microns, about 100 microns, about 110 microns, about 120 microns, about 130 microns, about 140 microns, about 150 microns, about 160 microns, about 170 microns, about 180 microns, about 190 microns, about 200 microns, or any value in between). Other values are possible.

As shown in FIG. 6C, the energy storage device 601 can also include a sealed portion 610$_s$ extending from the cell housing portion 610$_h$. The sealed portion 610$_s$ can be formed by sealing portions 620 of one or more walls 610'$_a$, 610'$_b$ of the cell housing portion 610$_h$. As described herein with respect to the cell housing portion 610$_h$, the walls 610'$_a$, 610'$_b$ of the sealed portion 610$_s$ can comprise a flexible material. For example, the sealed walls 610'$_a$, 610'$_b$ may readily fold onto the cell housing portion 610$_h$ upon application of pressure on the sealed portion 610$_s$. The sealed walls 610'$_a$, 610'$_b$ may also readily fold into an indentation 640. Accordingly, as described herein with respect to the cell housing portion 610$_h$, in some embodiments, one or more walls 610'$_a$, 610'$_b$ of the sealed portion 610$_s$ may comprise aluminum. For example, one or more walls 610'$_a$, 610'$_b$ of the sealed portion 610$_s$ may comprise an aluminum laminated pouch material. In various embodiments, the sealed portion 610$_s$ can be formed by heat sealing the one or more walls 610'$_a$, 610'$_b$. In some embodiments, the sealed portion 610$_s$ can be hermetically sealed.

FIG. 6C shows the sealed portion 610$_s$ including two sealed portions (e.g., one on the left and one on the right). In various embodiments, the sealed portions 610$_s$ can include three, four, or more portions. As shown in FIG. 6C, the sealed portion 610$_s$ can be folded onto the cell housing portion 610$_h$ so that part of the sealed portion 610$_s$ can reside in the indentation 640. FIG. 6C shows two sealed portion 610$_s$ with each residing in its own separate indentation 640. In other embodiments, each sealed portion 610$_s$ can reside in a common indentation 640.

The sealed portion 610$_s$ can have a width $w_s$, length $L_s$, and thickness $t_s$. Example definitions for the width $w_s$, length $l_s$, and thickness $t_s$ are provided herein. However, other conventions for defining width $w_s$, length $l_s$, and thickness $t_s$ are possible.

As shown in FIGS. 6A-6C, the width $w_s$ of the sealed portion 610$_s$ can correspond to the amount of seal 620 between the walls 610'$_a$, 610'$_b$ of the sealed portion 610$_s$ extending from the cell housing portion 610$_h$ in the x direction when unfolded (e.g., in the dimension extending horizontally in the cross-sectional plane when unfolded). The width $w_s$ of the sealed portion 610$_s$ can be sufficient to seal the walls $610'_a$, $610'_b$ together such that the sealed portion $610_s$ does not leak. In various embodiments, if the width $w_s$ of the sealed portion $610_s$ is too wide, space can be wasted. However, if the width $w_s$ of the sealed portion $610_s$ is too narrow, the sealed portion $610_s$ could leak and cause a reliability or safety issue. In some embodiments, the sealed portion $610_s$ can have a width $w_s$ in the range of about 1 mm to about 15 mm, or in a range between the foregoing values, such as of about 1.5 mm to about 10 mm (e.g., about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, or any value in between). Other values are possible. The width $w_s$ of the sealed portion $610_s$ can be selected based on the desired application and/or performance.

The length $l_s$ of the sealed portion $610_s$ can correspond to the amount of seal between the walls $610'_a$, $610'_b$ of the sealed portion $610_s$ extending in the y direction when unfolded (e.g., in the dimension extending into the page perpendicular to the cross-sectional plane when unfolded). The length $l_s$ is typically longer than the width $w_s$. In some embodiments, the sealed portion $610_s$ can have a length $l_s$ in the range of about 1 mm to about 15 mm, or in a range between the foregoing values, such as of about 2 mm to about 12 mm, of about 2 mm to about 10 mm (e.g., about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, or any value in between). For some electrochemical cells for mobile applications, the length $l_s$ can be in the range of about 1 mm to about 5 mm. The length $l_s$ of the sealed portion $610_s$ can be selected based on the desired application and/or performance.

The thickness $t_s$ of the sealed portion $610_s$ can correspond to the dimension extending in the z direction when unfolded (e.g., in the dimension extending vertically in the cross-sectional plane when unfolded). In some embodiments, since walls $610'_a$, $610'_b$ can be sealed to form the sealed portion $610_s$ the sealed portion $610_s$ can have a thickness $t_s$ that is approximately equal to the sum of the thicknesses $t_a$, $t_b$ of the sealed walls $610'_a$, $610'_b$. For example, in some embodiments where the thicknesses $t_a$, $t_b$ of the sealed walls $610'_a$, $610'_b$ are substantially the same, the thickness $t_s$ of the sealed portion $610_s$ can be approximately twice the thickness $t_a$, $t_b$ of the either one of the sealed walls $610'_a$, $610'_b$ (for example, $t_s \approx 2 \times t_a$ or $2 \times t_b$).

However, in some other embodiments, the thickness $t_s$ of the sealed portion $610_s$ can be modified by sealing walls $610'_a$, $610'_b$ for the sealed portion $610_s$ having different thicknesses $t_a$, $t_b$ such that the sum of the thicknesses $t_a$, $t_b$ provide the desired thickness $t_s$ for the sealed portion $610_s$. The thickness $t_s$ of the sealed portion $610_s$ can be selected based on the desired application and/or performance.

In certain embodiments, the energy storage device 601 has a first major exterior surface 601, a second major exterior surface 602, and an energy storage device thickness $t_d$ extending therebetween. In various embodiments, the width $w_s$ of the sealed portion when unfolded can be larger than the thickness of the energy storage device $t_d$. In various embodiments, the sealed portion $610_s$ can be folded adjacent the first major surface 601 (e.g., against the cell housing portion $610_h$ near the first major surface 601). In some embodiments, the sealed portion $610_s$ can also be folded on the cell housing portion $610_h$ near the second major surface 602. For example, the indentation 640 can be located adjacent the second major surface 602 and the seal portion $610_s$ can also be folded onto the cell housing portion $610_h$ near the second major surface 602.

In such examples, compared to the example in FIG. 5, the sealed portions $610_s$ can be folded on the cell housing portion $610_h$ without increasing the thickness of the device $t_d$. For example, by having the smaller electrode 605', the cell housing portion $610_h$ can form an indentation 640 adjacent the smaller electrode 605'. The sealed portion $610_s$ can be folded onto the cell housing portion $610_h$ so that at least part of the sealed portion $610_s$ can reside in the indentation 640. Accordingly, even though the width $w_s$ of the sealed portion $610_s$ can be larger than the thickness of the energy storage device $t_d$, the sealed portion $610_s$ can reside in space that would have been occupied by electrodes 605 in a stack of electrodes 605 having the same dimensions. As such, unused space can also be reduced (and minimized in some cases).

The actual width $w_s$, length $l_s$, and thickness $t_s$ dimensions for the sealed portion $610_s$ can be designed such that part of the sealed portion $610_s$ can reside within the indentation 640 with a single layer of the sealed portion $610_s$ (e.g., as shown in FIGS. 6B-6C). In other embodiments, the width $w_s$, length $l_s$, and thickness $t_s$ dimensions can result in part of the sealed portion $610_s$ being folded in multiple layers with at least a part of the sealed portion $610_s$ residing in an indentation 640 (e.g., similar to the examples shown in FIGS. 3 and 4 but with a part of the sealed portion $610_s$ residing in an indentation 640). In various embodiments, the sealed portion $610_s$ can be attached onto the cell housing portion $610_h$ (e.g., using glue).

In some embodiments, the energy storage device 601 may comprise an anode connector (not shown) and a cathode connector (not shown) configured to electrically couple the anodes and the cathodes of the electrode stack to an external circuit, respectively. The anode connector and/or a cathode connector may be affixed to the walls $610'_a$, $610'_b$ of the cell housing portion $610_h$ or to the walls $610'_a$, $610'_b$ of the sealed portion $610_s$ to facilitate electrical coupling of the energy storage device 601 to an external circuit. The anode connector and/or the cathode connector may be affixed to a wall $610'_a$, $610'_b$ along one edge of the cell housing portion $610_h$ and/or the sealed portion $610_s$. The anode connector and/or the cathode connector can be electrically insulated from one another, and from the cell housing portion $610_h$ and/or the sealed portion $610_s$. For example, at least a portion of each of the anode connector and/or the cathode connector can be within an electrically insulating sleeve such that the connectors can be electrically insulated from one another and from the cell housing portion $610_h$ and/or the sealed portion $610_s$.

Certain embodiments described herein relate to the energy storage device 601, e.g., a pouched energy storage device. Various embodiments described herein also relate to a pouch for an energy storage device 601 as shown in FIGS. 6A-6B. For example, the pouch can include the cell housing portion $610_h$ and the sealed portion $610_s$ as described herein. The cell housing portion $610_h$ can have walls $610'_a$, $610'_b$ defining an inner region 615. The walls $610'_a$, $610'_b$ can be configured to house within the inner region 615 an anode, a cathode, a separator, and an electrolyte. The cell housing portion $610_h$ can include an indentation 640. The sealed portion $610_s$ can extend from the cell housing portion $610_h$. The sealed portion $610_s$ can be folded onto the cell housing portion $610_h$ such that part of the sealed portion $610_s$ can resides in the indentation 640.

Figure 7:
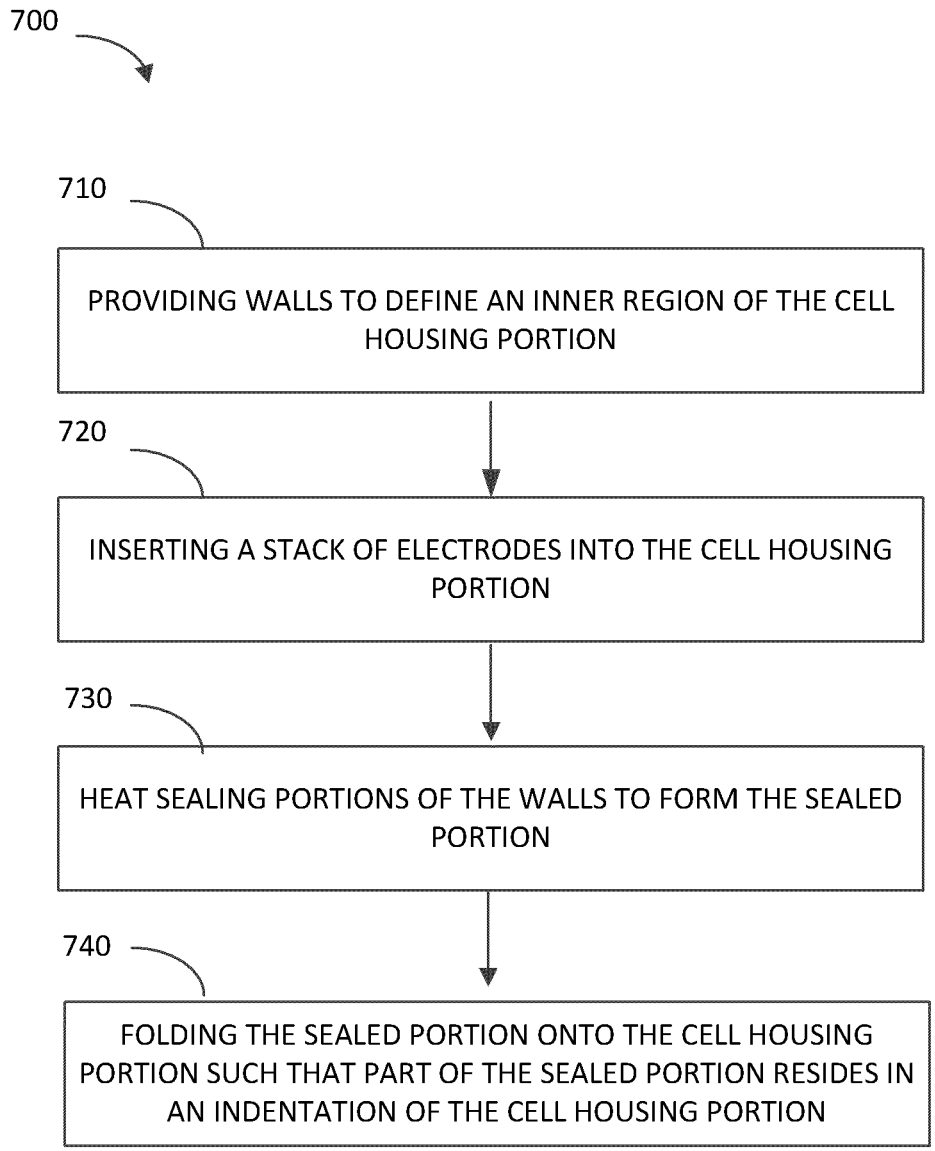
FIG. 7 schematically illustrates a flow diagram of an example method of making a pouched energy storage device in accordance with certain embodiments described herein.

As shown in FIG. 7, certain embodiments described herein also relate to a method 700 of making a pouched energy storage device. As shown in operational block 710, the method 700 can include providing walls $610'_a$, $610'_b$ to define an inner region 615 of the cell housing portion $610_h$. The walls $610'_a$, $610'_b$ can be configured to house within the inner region 615 an anode, a cathode, a separator, and an electrolyte. As shown in operational block 720, the method 700 can also include inserting a stack of electrodes 650 into the cell housing portion $610_h$. Each electrode 605 can have dimensions of width $w_e$, length $l_e$, and thickness $t_e$. One or more electrodes 605' can have at least one of the dimensions (e.g., $w'_e$, $l'_e$, and/or $t'_e$) smaller than a corresponding dimension (e.g., $w''_e$, $l_e$, and/or $t''_e$) of other electrodes 605'' in the stack of electrodes 605. As shown in operational block 730, the method 700 can further include heat sealing portions of the walls $610'_a$, $610'_b$ to form the sealed portion $610_s$. As shown in operational block 740, the method 700 can further include folding the sealed portion $610_s$ onto the cell housing portion $610_h$ such that part of the sealed portion $610_s$ resides in an indentation 640 of the cell housing portion $610_h$.

In various embodiments, the method 700 can further include forming the indentation 640 on the cell housing portion $610_h$. In various embodiments, the indentation 640 can be formed after inserting the stack of electrodes 650 into the cell housing portion $610_h$. Alternatively, in some embodiments, the indentation 640 can be formed before inserting the stack of electrodes 650 into the cell housing portion $610_h$. The indentation 640 can be sized to accommodate at least part of the sealed portion $610_s$. The indentation 640 can define a stepped region in the inner region 615.

In some embodiments, providing the walls $610'_a$, $610'_b$ can comprise providing aluminum laminate pouch material. Heat sealing portions of the walls $610'_a$, $610'_b$ can comprise hermetically sealing the portions of the walls $610'_a$, $610'_b$. In addition, folding the sealed portion $610_s$ onto the cell housing portion $610_h$ can include folding a first region of the sealed portion $610_s$ adjacent a first major surface 601 of the device 601, and folding a second region of the sealed portion $610_s$ adjacent a second major surface 602 of the device 601. The method 700 can also include attaching the sealed portion $610_s$ onto the cell housing portion $610_h$.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A pouched energy storage device comprising:
   a cell housing portion and a sealed portion;
   a stack of electrodes housed within an inner region of the cell housing portion, each electrode having dimensions of width, length, and thickness, wherein one or more electrodes have a first width and one or more other electrodes have a second width that is smaller than the first width;
   an indentation on the cell housing portion adjacent the sealed portion, wherein the indentation forms a stepped region in the inner region wherein a width of the stepped region is half a difference between the first width and the second width; and
   wherein the sealed portion is folded onto the cell housing portion so that at least a part of the sealed portion resides in space resulting from the second width being smaller than the first width.

2. The device of claim 1, wherein the device is a lithium ion battery, a lithium polymer battery, or a metal lithium battery.

3. The device of claim 1, wherein walls of the cell housing portion have a wall thickness, and the sealed portion has a sealed portion thickness that is approximately twice the wall thickness of the walls of the cell housing portion.

4. The device of claim 1, wherein the device comprises at least two sealed portions.

5. The device of claim 1, comprising a first major exterior surface, a second major exterior surface, and a device thickness extending therebetween, wherein the sealed portion has a sealed portion width, a sealed portion length, and a sealed portion thickness, and wherein the device thickness is smaller than the sealed portion width.

6. The device of claim 5, wherein the sealed portion width is in the range of about 1.5 mm to about 10 mm.

7. The device of claim 1, wherein the device comprises a first major surface and a second major surface, and wherein the sealed portion is folded adjacent the first major surface of the device and the indentation is located adjacent the second major surface of the device.

8. The device of claim 1, wherein the sealed portion is folded to form multiple layers.

9. The device of claim 1, wherein the sealed portion is attached onto the cell housing portion.

10. A method of making a pouched energy storage device, comprising:
    providing walls to define an inner region of the cell housing portion, the walls configured to house within the inner region an anode, a cathode, a separator, and an electrolyte;
    inserting a stack of electrodes into the cell housing portion, each electrode having dimensions of width, length, and thickness, wherein one or more electrodes have a first width and one or more other electrodes have a second width that is smaller than the first width;
    heat sealing portions of the walls to form the sealed portion; and
    folding the sealed portion onto the cell housing portion such that part of the sealed portion resides in an indentation of the cell housing portion, wherein a width of the indentation is half a difference between the first width and the second width.

11. The method of claim 10, further comprises:
    forming the indentation on the cell housing portion, wherein the indentation is sized to accommodate at least part of the sealed portion.

12. The method of claim 10, wherein the indentation defines a stepped region in the inner region.

13. The method of claim 10, wherein providing walls comprises providing aluminum laminate pouch material.

14. The method of claim 10, wherein heat sealing portions of the walls comprises hermetically sealing the portions of the walls.

15. The method of claim 10, wherein folding the sealed portion onto the cell housing portion comprises:
    folding a first region of the sealed portion adjacent a first major surface of the housing portion; and
    folding a second region of the sealed portion adjacent a second major surface of the housing portion.

16. The method of claim 10, further comprising attaching the sealed portion onto the cell housing portion.

17. A pouch for an energy storage device comprising:
a cell housing portion having walls defining an inner region, the walls configured to house within the inner region an anode, a cathode, a separator, and an electrolyte, the cell housing portion comprising an indentation; and
a sealed portion extending from the cell housing portion, wherein the sealed portion is folded onto the cell housing portion such that part of the sealed portion resides in the indentation, wherein a width of the indentation is half a difference between a width of one or more electrodes that is smaller than a width of one or more other electrodes in a stack of electrodes.

18. The pouch of claim 17, wherein the walls are configured to house a lithium ion battery, a lithium polymer battery, or a metal lithium battery.

19. The pouch of claim 17, wherein the walls of the cell housing portion and the sealed portion comprise an aluminum laminate pouch material.

20. The pouch of claim 17, wherein the indentation forms a stepped region in the inner region of the cell housing portion.

21. The pouch of claim 17, wherein the walls of the cell housing portion have a wall thickness, and the sealed portion has a sealed portion thickness that is approximately twice the wall thickness of the walls of the cell housing portion.

22. The pouch of claim 17, wherein the pouch comprises at least two sealed portions.

23. The pouch of claim 17, wherein the pouch comprises a first major exterior surface, a second major exterior surface, and a pouch thickness extending therebetween, wherein the sealed portion has a sealed portion width, a sealed portion length, and a sealed portion thickness, and wherein the pouch thickness is smaller than the sealed portion width.

24. The pouch of claim 23, wherein the sealed portion width is in the range of about 1.5 mm to about 10 mm.

25. The pouch of claim 17, wherein the pouch comprises a first major surface and a second major surface, and wherein the sealed portion is folded adjacent the first major surface of the pouch and the indentation is located adjacent the second major surface of the pouch.

26. The pouch of claim 17, wherein the sealed portion is folded to form multiple layers.

27. The pouch of claim 17, wherein the sealed portion is attached onto the cell housing portion.

* * * * *